United States Patent

Rawson et al.

[15] 3,679,875

[45] July 25, 1972

[54] MEDICAL TEST DATA ENTRY TERMINAL

[72] Inventors: Edward B. Rawson, Lincoln; John B. Dowling, Stow, both of Mass.

[73] Assignee: Searle Medidata Inc., Waltham, Mass.

[22] Filed: Sept. 21, 1970

[21] Appl. No.: 73,973

[52] U.S. Cl. ........................235/61.7 R, 340/149 R, 340/365

[51] Int. Cl. ..........................................G06f 3/02, G06r 5/00

[58] Field of Search .................235/61.6, 61.7, 61.9; 178/79, 178/17; 340/365, 149 A, 152, 153

[56] References Cited

UNITED STATES PATENTS

| | | | |
|---|---|---|---|
| 3,158,317 | 11/1964 | Alexander | 235/61.6 |
| 3,457,391 | 7/1969 | Yamamoto | 340/149 A |

*Primary Examiner*—Thomas A. Robinson
*Attorney*—Weingarten, Maxham and Schurgin

[57] ABSTRACT

A terminal for the real time entry of medical test data into the computer based medical record of a patient. The terminal is operative only by an operator whose identification has been verified, and test data is visually verified before entry into the patient record.

9 Claims, 6 Drawing Figures

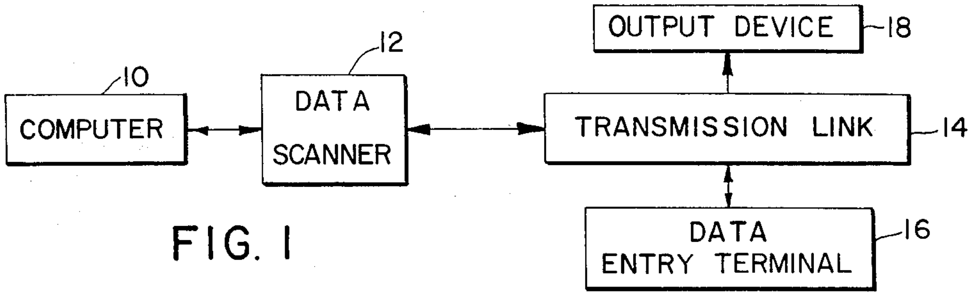
FIG. I
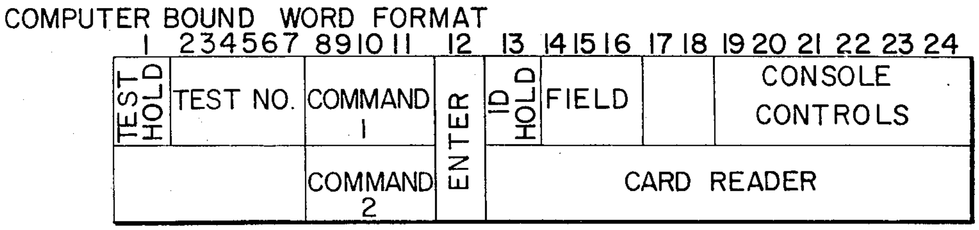
FIG. 3
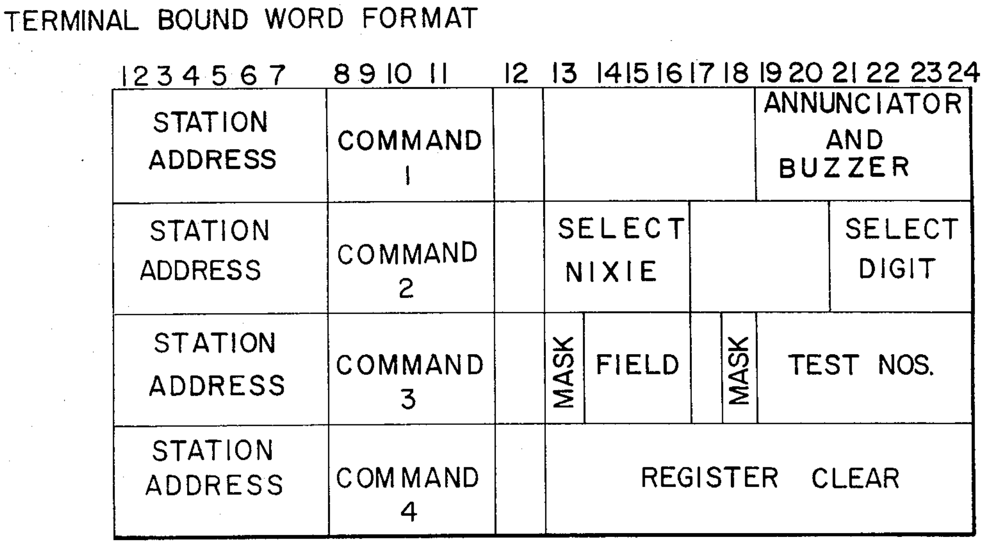
FIG. 4
INVENTORS
EDWARD B. RAWSON
JOHN B. DOWLING
BY
Wenyoton, Mochan + Schwyn
ATTORNEYS

INVENTORS
EDWARD B. RAWSON
JOHN B. DOWLING
BY
ATTORNEYS

INVENTOR
EDWARD B. RAWSON
JOHN B DOWLING
BY
[signature]
ATTORNEYS

INVENTORS
EDWARD B. RAWSON
JOHN B. DOWLING
BY
ATTORNEYS

MEDICAL TEST DATA ENTRY TERMINAL

FIELD OF THE INVENTION

This invention relates to electronic data communication and more particularly to data terminals for the remote entry of medical test data into a computer.

BACKGROUND OF THE INVENTION

In the automated medical screening of patients, such as described in copending patent application Ser. No. 759,389 entitled Multi-Phasic Medical Screening System, assigned to the assignee of the present invention, it is often required to enter data concerning the laboratory analysis of body fluids into a computer for processing along with data from other data entry stations. Such tests, including blood chemistry, hematology, and urine tests, are accomplished by well known medical laboratory apparatus and the data concerning the respective tests performed and the results of these tests must be assembled into a form suitable for subsequent digital processing. In order for such data to be entered on a real time basis into the computer, there is a requirement for an entry terminal which is easily operated and which provides means for preventing unauthorized use of the terminal and also positive identification of the data and the associated patient.

SUMMARY OF THE INVENTION

In accordance with the present invention, a data entry terminal is provided for the real time entry of medical test data into a computer-based medical record of a patient in a verified manner and in a manner which affords simplicity of manual operation. The terminal includes a console typically of desk top size, having operating controls for selecting the particular tests to be entered and the results associated with such tests. Indicators are provided for displaying the data contents received by the computer to visually verify the validity of data before its entry into the patient record in computer memory. The sequence of tests and data to be entered can be computer controlled or manually selectable as desired in particular instances. As a particular feature of the invention, unauthorized use of the terminal is prevented by means of a coded operator identity card which must be employed in conjunction with a valid operator identification number therein in order for processing to proceed. Moreover, means are provided for properly identifying the identity of a particular patient so that data for the particular patient is entered in his record.

DESCRIPTION OF THE DRAWINGS

The invention will be more fully understood from the following detailed description taken in conjunction with the accompanying drawings, in which:

FIG. 1 is a block diagram of a data entry system in which the invention is employed;

FIG. 3 is a diagrammatic representation of the data format of messages directed by the invention to a computer;

FIG. 4 is a diagrammatic representation of the data format of messages received by the invention;

DETAILED DESCRIPTION OF THE INVENTION

Figure 2:
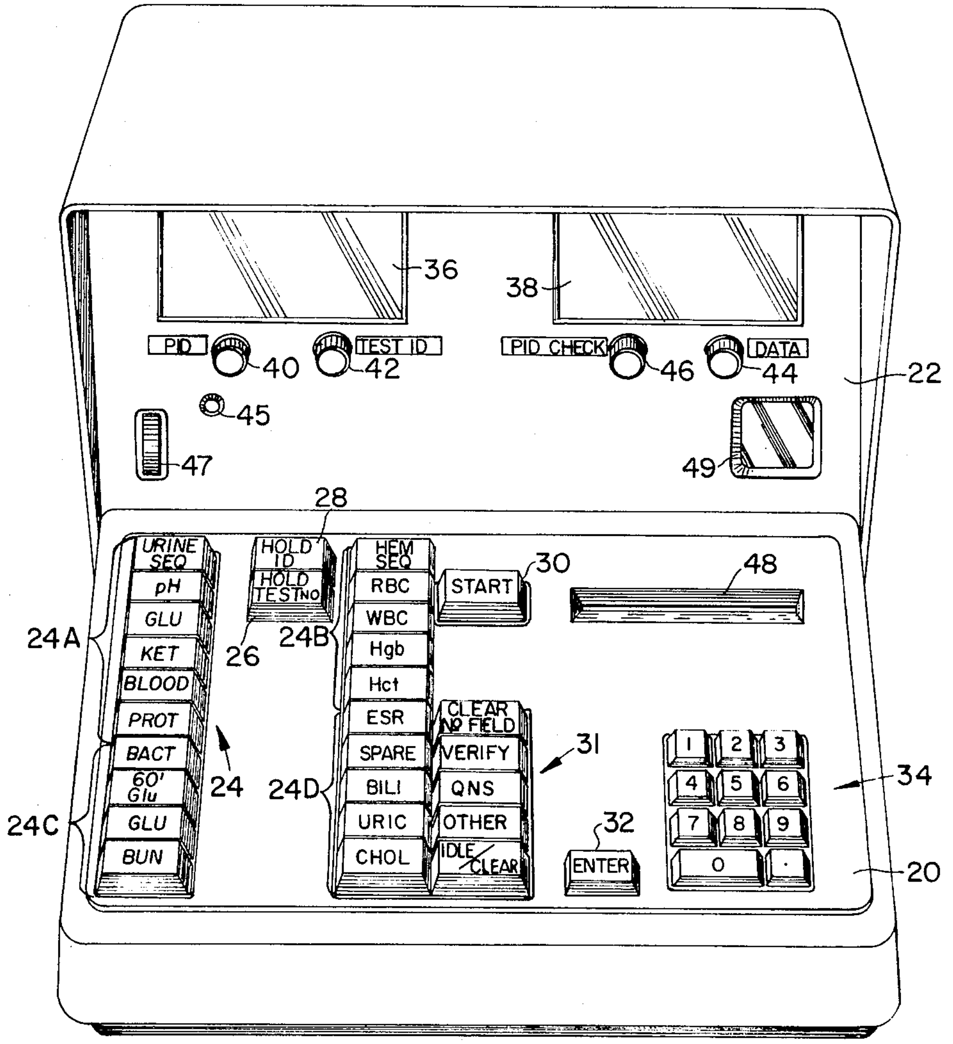
FIG. 2 is a pictorial view of a data entry console embodying the invention.

A real time data entry system in which the invention is employed is illustrated in FIG. 1. A computer 10 is coupled to a data scanner 12 which, in turn, is coupled via a suitable transmission link 14 to a laboratory data entry terminal 16. Other like terminals may also be coupled to scanner 12, as can data terminals for other purposes such as described in the above-identified copending application. A teletypewriter 18 or other output device is also coupled to link 14 for providing a printed data output. As described in the aforesaid application, scanner 12 is operative to sequentially address each remote station, and to provide communication between each station and the computer for a selected interval of time, during which information is conveyed from the computer to the respective station and from a station back to the computer. Each data station is on-line with the computer at all times but is communicative therewith only during predetermined intervals.

A data entry terminal 16, which is the subject of this invention, is shown in FIG. 2 and in the illustrated embodiment is operative to enable an operator to enter into a patient record stored in computer memory the results of laboratory tests made on blood and urine samples. In the discussion which follows, data from the computer to the terminal will be referred to as the terminal bound word (TBW), while data from the terminal to the computer will be referred to as the computer bound word (CBW).

The computer is typically of a type having a direct memory access capability such as a PDP-8I computer sold by the Digital Equipment Corporation. The data scanner 12 operative to control operation of the terminal 16 and to provide communication between the terminal and computer 10, as well as other data terminals and stations of the overall system, is described in the above-identified copending application.

The data entry terminal is physically embodied in a console, depicted in FIG. 2, which includes a front panel 20 containing test and control buttons and a data entry keyboard, and an upstanding panel 22 having numeric displays and indicator lamps for denoting data and console operation. A plurality of test buttons 24 are provided on panel 20, of a number of suit particular requirements. These test buttons are of the illuminating type and contain legends as illustrated to denote respective test identities. Actuation of each test button causes generation of a digital signal which identifies a particular test, the associated test results of which are to be entered into the patient record in computer memory. The associated button lamps are illuminated by command from the computer to denote that the computer has received data represented by the actuated button. A HOLD TEST No. button 26 and a HOLD ID button 28 are provided to permit retention of test and identification data, respectively, as will be described.

The terminal also includes a plurality of indicator buttons 31, labeled as illustrated, for denoting respective conditions and appropriately controlling terminal operation. These buttons are also of the illuminated type, and are operative in a manner similar to the test buttons 24. The button labeled CLEAR NO. FIELD is employed to clear the numeric displays in order to erase incorrect data. The VERIFY button is employed to indicate that a previously entered test result should be verified, and may be used for example when a test result which is out of normal range has been entered. Upon entry of such abnormal test result, the computer will cause actuation of the verify indicator to request the operator to validate this entry by depressing the associated button. In this manner an operator is warned that a particular test result may be wrong, and also permits an indication to be recorded in the computer based patient record that a particular result has been verified.

The QNS button denotes that the urine or blood sample was of a quantity not sufficient to perform a test. The OTHER button when actuated permits entry of other test numbers by means of keyboard 34, in addition to those test numbers represented by the test buttons 24 provided on the console panel. The versatility of the terminal is thus extendable to additional tests which can be encoded by use of the data entry keyboard. The IDLE/CLEAR button is employed to clear the registers of the terminal, which can also be accomplished by withdrawing the operator identification card from its associated slot 48. A START button 30 is provided to commence or enable terminal operation. An ENTER button 32 is employed for the manual entry of data into the computer-based patient record after visual verification of the data, as will be described. A numeric keyboard 34 is provided on panel 20 for the entry of numerical data, including patient identification and test results.

An annunciator display 49 is provided on panel 22 for displaying instructions to the terminal operator during the data entry process. This display is, in the illustrated embodiment, of the rear projection type in which selected messages are projected upon a translucent screen for viewing by the operator. In a typical terminal, the following messages are provided for display: Insert ID, Ready, Illegal Data, Accepted High, Accepted Low, Equipment Failure, Wait, Special Patient, Entry Accepted, Series Complete, Draw Blood Sample, and Repeat Entry. A buzzer is also provided within the terminal console and is operative to warn of equipment malfunction or an illegal condition. A volume control 47 is provided on panel 22 for adjusting the volume of the signal buzzer, and a test button 45 is also provided as a ready means of testing buzzer operation.

A numeric display 36 provides visual display of a patient identification number as entered via keyboard 34, while a similar numeric display 38 visually represents test data, also entered via keyboard 34. Each display 36 and 38 is typically a multidigit Nixie tube display. It is a feature of the invention that data is visually verified prior to its entry into the patient record in computer memory. Both the patient identification number and test data manually entered on keyboard 34 are transmitted to the computer in a computer bound word and this data is written back to the terminal from the computer in a terminal bound word to cause visual display of the respective data on displays 36 and 38. The data that is visually displayed is, therefore, as received by the computer, thereby providing visual verification that valid data was received by the computer. Upon verification by the operator of the data as displayed on the console, this data is entered by means of ENTER button 32 into the patient record in computer memory. Data entry is verified by display of an Entry Accepted message on annunciator 49.

Four field indicators are provided to instruct the terminal operator of subsequent steps to be performed. More specifically, the field indicators include a PID indicator 40 which upon illumination denotes a request for entry of a patient identification number. A TEST ID indicator 42 denotes a request for entry of a test identification number. A PID CHECK indicator 46 signals a request for entry of a check digit, while DATA indicator 44 provides a request for entry of test data.

The test buttons 24 represent and identify the individual tests and test sequences which are to be performed. The buttons 24A represent a urine sequence which includes tests for pH, glucose, ketones, blood, and protein. The buttons 24B represent a hematology sequence which includes tests for red blood cell count, white blood cell count, hemoglobin and hematocrit. When entering data in each of these test sequences, the computer causes illumination of subsequent button indicators after entry of data for each previous test in the sequence such that the operator is conducted through the sequence in an orderly fashion. Other tests performed on a blood sample are denoted by console buttons 24C which respectively represent tests for bacteria, sixty minute glucose, glucose and blood urea nitrogen. Buttons 24D denote further blood tests; namely, erythrocytes sedimentation rate, billirubin, uric acid and cholesterol. A SPARE button is shown for inclusion of an additional blood chemistry test as may be desired.

The HOLD ID button 28 and HOLD TEST button 26 permit different modes of terminal operation to suit specific requirements. When a complete set of test results of a single patient is to be entered into the patient's medical record, it is usually convenient to actuate button 28 which will cause the computer to retain the patient identification until the testing sequence is completed. The operator enters the test results from the respective tests as sequentially called for by the computer by appropriate illumination of test buttons 24. After all data has been entered for a particular patient, the IDLE/CLEAR button is depressed to reset the terminal to its initial state.

If the results of a single test on several patients are to be entered, the button 26 is depressed together with the selected test button 24 for the test, the results of which are to be entered. A sequence of patient identification numbers and associated test results is then entered via keyboard 34. The test number will be retained by the computer until the button 26 is released.

In order to permit use of the data entry terminal and consequent entry of data only by an authorized individual, an operator identification code number is employed which must be entered into the computer before subsequent data entries will be accepted for processing. The operator identification code is typically contained within an identification card, much like a well known credit card, which is inserted within a slot 48 provided in panel 20 for decoding by a card reader within the console. The card reader, which itself can be of any well known type, provides a coded identification number which is transmitted to the computer which, upon receipt of a valid operator identification, will initiate terminal operation.

Before describing the detailed implementation of the terminal logic circuitry and its operation, it will be useful to consider the data word formats employed in the invention. The computer bound word format is illustrated in FIG. 3, while the terminal bound word format is depicted in FIG. 4, a 24 bit word format being employed in the illustrated embodiment. Two commands are employed for transmission from the terminal to the computer via a computer bound word. One command, which is generated by actuation of START button 30, causes transmission to the computer of an operator identification number as read from the operator identification card. The other command conveys data respecting the state of the console controls and indicators. If the START button is depressed and no operator identification card is inserted, or if a card is inserted but contains an erroneous identification number, the computer will recognize these events and cause illumination of a suitable message on annunciator 49 (Illegal Data) to denote an illegal condition.

If the computer receives a valid operator identification number, a terminal bound word is directed to the terminal to cause illumination of a Ready message on annunciator 49. Four terminal bound word commands are employed in the illustrated embodiment, namely: write to annunciator and buzzer; write to displays; write to field lights and test number lights; and clear registers. It will be noted that the station address is encoded in bit positions 1–7 of each terminal bound word command, and the terminal is operative upon recognition of its address to permit decoding of the data content in the received word. The command identity is encoded in bits 8–11 of each computer bound word and terminal bound word. Bit 12, in the computer bound word, when set, denotes that data is to be entered. In the first command, bits 19–24 are employed, bit 19 designating buzzer actuation, bit 20 being set to write to the annunciator and bits 21–24 designating the message to be displayed thereon. The second command, which is employed to write to the numeric displays 36 and 38, utilize bits 13–17 to select the indicator tube of the Nixie display, while bits 21–24 represent the digit to be displayed. In the third command, bit 13 is set to write to the field lights, while bits 14–17 designate the particular field light to be energized. Bit 18 is set to write to the test number lights, while the test numbers are encoded in bits 19–24. Bits 13–24 are employed in the fourth command to clear all terminal registers.

In operation, depression of a test button 24 causes generation of a six bit code identifying that button and the associated test number, and this data is assembled in bits 19–24 of a computer bound word for transmission to the computer. Upon receipt and decoding of this data, the computer writes back in bits 19–24 of a terminal bound word to cause illumination of the button light associated with the selected test number. The test number is subsequently directed back to the computer within bits 2–7 of a computer bound word for use by the computer in correlating the test number with received test results. In similar fashion, the identity of the energized field indicators is directed in bits 14–16 of a computer bound word to the computer as a verification of the field lights which have been actuated. It will be appreciated that information conveyed from the computer to the terminal is conveyed back to the computer for purposes of verification, as is information conveyed from the terminal to the computer. Erroneous receipt of information will signal an error condition which will be displayed on annunciator 49 for appropriate action by the operator. Completion of an entire test entry sequence is signalled by a buzz from the terminal buzzer and display of a Series Complete message on annunciator 49.

Figure 5:
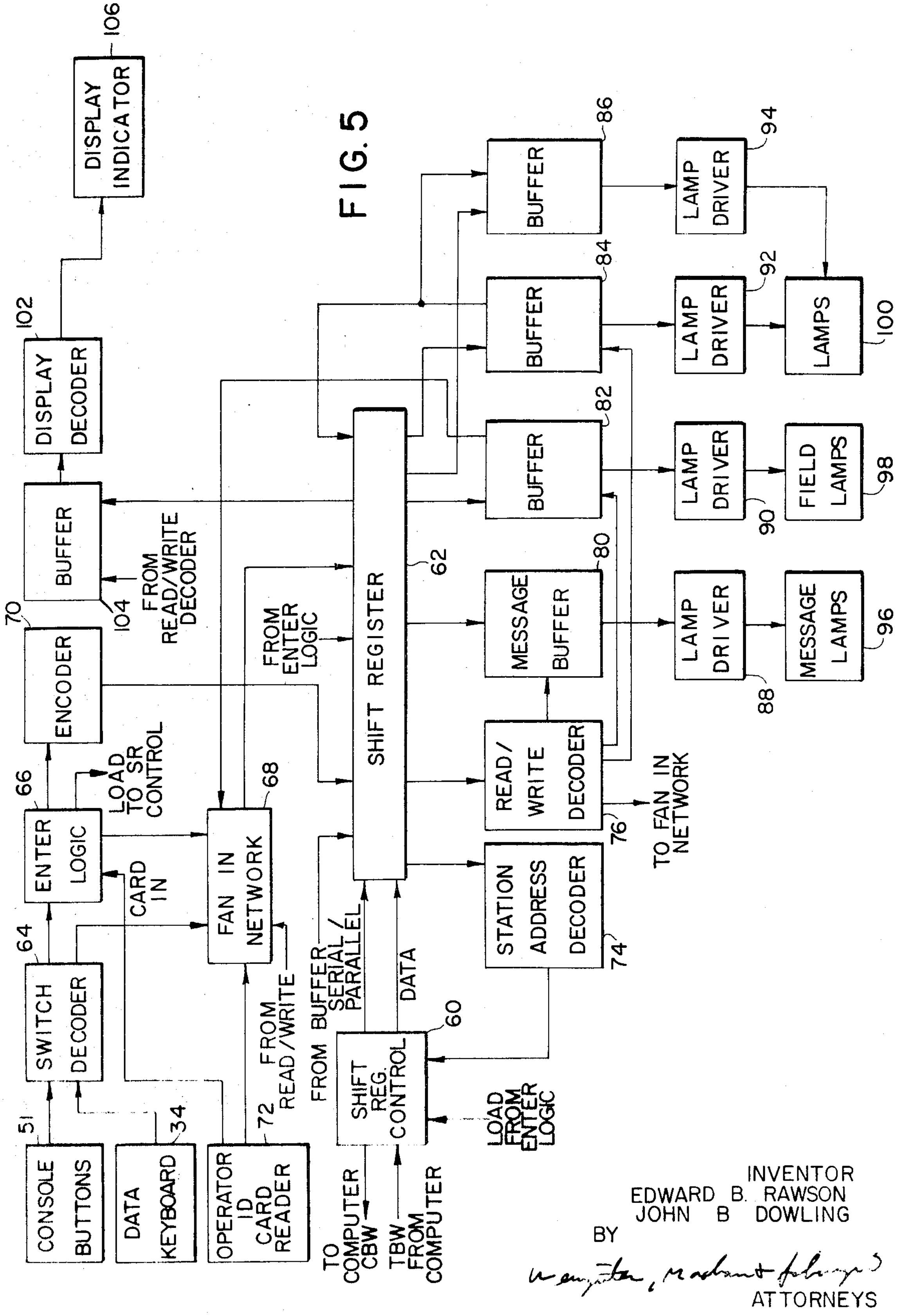
FIG. 5 is a block diagram of a data entry terminal according to the invention.

Referring to FIG. 5, the computer bound words and terminal bound words are conveyed over the system transmission link coupled to a shift register control 60 which is operative to convey data to and from a shift register 62, and which is also operative to control the serial and parallel data transfer thereof. The control buttons 51, which include the test and control buttons shown in FIG. 2, and the data keyboard 34, are coupled to a switch decoder 64 which is coupled to enter logic 66 and which has a second output coupled to a fan-in network 68. Enter logic 66 is coupled to an encoder 70, the output of which is coupled to selected bit positions of shift register 62. A card reader 72 is coupled to enter logic 66 and also to network 68 to provide a means for entry of an operator identification number in order to verify that data is being entered by an authorized individual.

The output of network 68 is coupled to selected bit positions of shift register 62. Shift register 62 is coupled to a station address decoder 74 which, in turn, is coupled to shift register control 60. The shift register is also coupled to a read/write decoder 76, an output of which is coupled to network 68. The shift register is also coupled to a plurality of buffers 80, 82, 84 and 86, each of which also receives an input signal from the decoder 76. Each buffer 80, 82, 84 and 86 is associated with a respective lamp driver 88, 90, 92 and 94. Lamp driver 88 is operative to energize message lamps 96 of annunciator 49, while driver 90 is operative to energize field lamps 98. Lamp drivers 92 and 94 are operative to energize respective coordinate lines of a lamp matrix 100 which includes the lamps associated with console buttons 24, 26, 28, 30, 31 and 32. The shift register 62 is also coupled via a buffer 104 to a display decoder 102 which, in turn, is coupled to a display indicator 106 identified in FIG. 2 as displays 36 and 38.

Actuation of one or more console buttons 51 and keys of data keyboard 34 causes corresponding signals to be applied to switch decoder 64 which identify the actuated switches and which provide a coded representation of the actuated switch identity to enter logic 66 and fan-in network 68. Switch decoder 64 is itself the subject of copending application Ser. No. 29,422 entitled Switch Coding Circuitry and assigned to the assignee of the present invention. Briefly, this switch decoder is operative to ascertain the identity of an actuated switch within an array of mechanically unrelated and electrically distinct input switches and to provide a coded switch signal which is free of contact bounce noise and which is representative of a valid switch actuation.

Operation of the novel terminal is best described in conjunction with FIG. 2 and FIG. 5. In its standby condition, the terminal will display the message Insert ID on annunciator 49, as decoded from a terminal bound word received from the computer. Upon insertion of an operator identity card in slot 48 and depression of START button 30, the operator identification number as read by card reader 72 is directed in a computer bound word to the computer which will ascertain whether the operator identification number is valid. If the number is not valid, the computer will direct a message to the terminal which will actuate an Illegal ID message on annunciator 49. If the identification number is valid, the computer will direct a message to the terminal which will cause illumination of field indicator 40 which signals the operator to enter the patient identification number. The indicator 40, as well as the other field indicators 42, 44, and 46, are selectively activated by decoding of bits 13–16 of a received terminal bound word by buffer 82 which, in turn, drives lamp driver 90 for actuation of the appropriate field lamps. Similarly, the annunciator messages are decoded by means of message buffer 80 which senses bits 20–24 of a received word from the computer.

Upon entry of a patient identification number via keyboard 34, this data is directed to the computer and is returned to the terminal for energization of display 36 for visual verification by the operator. If the patient identification number is correct, actuation of ENTER button 32 causes entry of this number into computer memory. Upon depression of the ENTER button, the annunciator 49 will display a Ready message, and indicator 46 will light to denote that a check digit is to be entered. A predetermined check digit is entered via keyboard 34, and if a valid digit is entered, indicator 42 will light calling for entry of test information. A TEST is then selected by the operator and a message from the computer will also cause illumination of this selected test button.

Indicator 44 is illuminated at this time. The test results for the actuated test number is then entered via keyboard 34, transmitted to the computer and redirected back to the terminal for display on display 38. Upon visual verification of the displayed test results, ENTER button 32 is depressed to cause entry of these test results into the patient record. If a test sequence was selected, the computer next directs a message to the terminal causing actuation of the next predetermined test button indicator calling for entry of corresponding test results. The entry of data proceeds in like manner until all data for a particular patient has been entered.

If erroneous data for a particular test is received by the computer, the annunciator 49 is caused to display an Illegal Data message to denote this error condition. The computer compares entered test data against predetermined limits and the annunciator will display appropriate messages indicating that received test results are conditionally accepted (Accepted High or Accepted Low) to warn the operator of marginal test results. The annunciator can also display messages indicative of equipment malfunction and the like. The particular sequence in which test results is entered is determined by the particular computer program associated with the computer coupled to the novel terminal. If desired, the test sequence can be determined manually by the operator by depressing each test button in any desired order in association with corresponding test results. It is often preferable, however, to provide control of the data entry sequence by means of the computer since the collection and processing of data by the computer is simplified by virtue of the known testing sequence employed.

Figure 6:
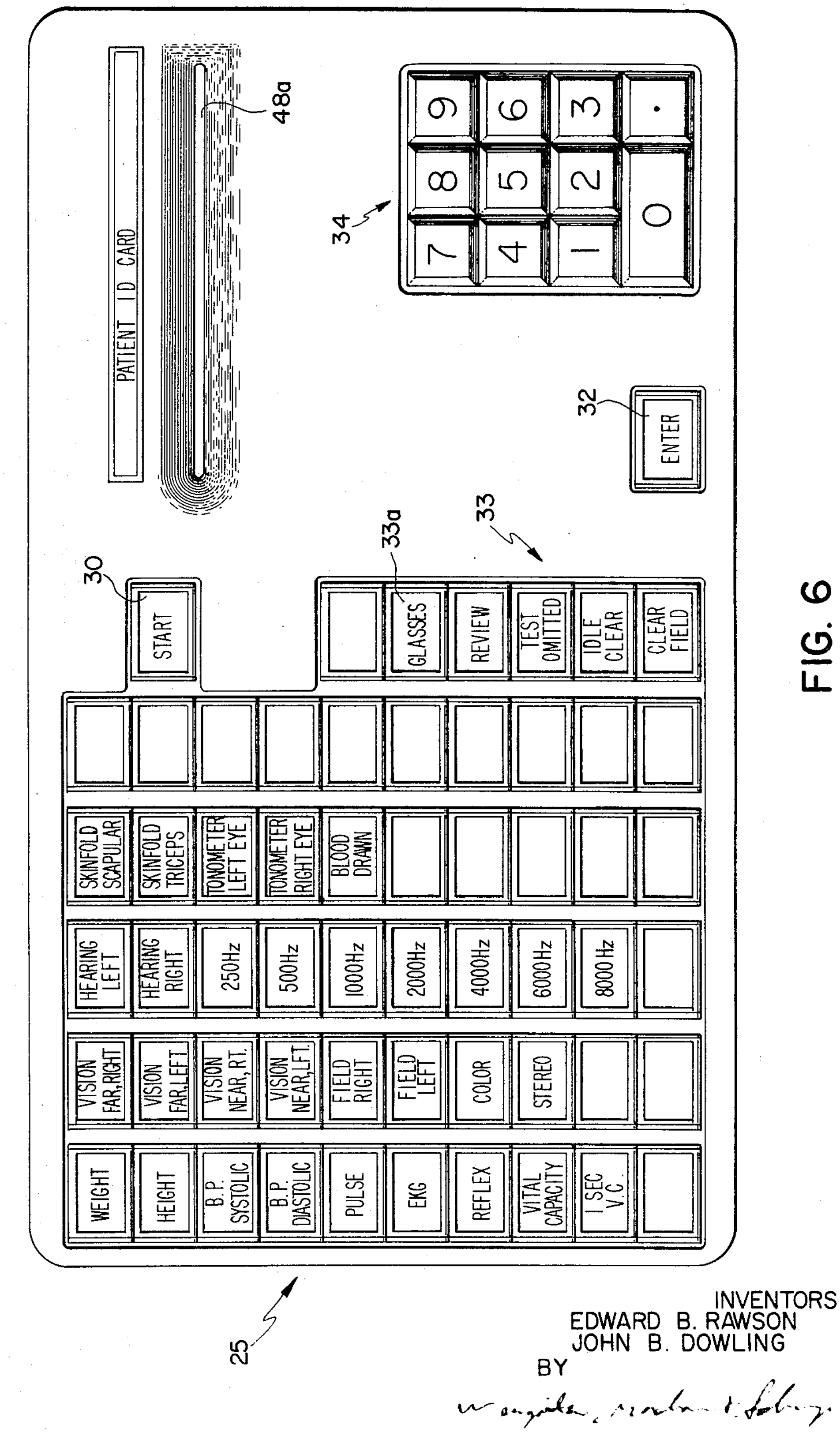
FIG. 6 is a pictorial view of an alternative data entry console embodying the invention.

In an alternative embodiment shown in FIG. 6, the data entry terminal is employed to enter test results in respect of a plurality of multiphasic tests performed on a patient, such as weight, height, vision and hearing, tonometry, vital capacity, blood pressure, and the like. As evidenced from FIG. 6, the console buttons 25 identify the particular tests, the results of which are to be entered into the computer-based patient record. Depression of a console button 25 causes a coded representation of test identity to be transmitted to the computer, which causes return of this coded identity to cause illumination of the button light associated with the actuated test button. A plurality of console buttons 33 are provided as before to govern terminal operation, but in addition include buttons which additionally identify test data to be entered. For example, button 33A, when actuated, causes generation of a code word which denotes that the patient wears glasses.

A patient identification card 48A is employed in this latter embodiment, rather than the operator card described hereinabove. Insertion of a patient identification card containing a valid identification number and actuating the START button 30 causes transmission of this number to the computer. Receipt by the computer of a valid patient identification number causes the computer to direct a command to the terminal for actuating display of a Ready message on annunciator 49.

A console button will next be illuminated by appropriate command from the computer to indicate that a particular test and associated results are to be entered into the patient record. Numerical data representative of test results for the actuated test button is entered via keyboard 34 and transmitted to the computer. These test results are reconveyed from the computer to the terminal for visual verification on display 38. The verified test results are then entered into the patient record by actuation of enter button 32. Other test buttons are illuminated by subsequent computer command and associated results entered in like manner. The test sequence continues until all tests and associated results have been entered.

In an alternative mode of operation, a test button 25 is manually selected to cause transmission of a test number to the computer. The computer will write back to the terminal to cause illumination of the selected test button light to signify receipt of a test number. Test results for the selected test are then entered via keyboard 34 and ENTER button 32, as previously described.

Various modifications and alternative implementations will occur to those versed in the art without departing from the spirit and true scope of the invention. For example, the particular data fOrmat described herein is merely illustrative of a typical data structure. Accordingly, it is not intended to limit the invention by what has been particularly shown and described, except as indicated in the appended claims.

What is claimed is:

1. A data terminal for the entry of medical test data into a computer-based medical record of a patient comprising:

a plurality of test buttons each representing a respective medical test, the results of which are to be entered into said medical record;

a plurality of control buttons for initiating respective control steps in said terminal;

a data keyboard for the manual entry of numerical data;

logic circuitry coupled to said test buttons and data keyboard and operative upon actuation of said test buttons and keyboard to provide digital signal representations of said actuated test buttons and keyboard;

means for assembling said digital signal representations into data words for transmission to a computer;

means for decoding data words received from said computer;

means for visually displaying numerical data decoded from said computer data word;

means for visually indicating subsequent steps to be taken by a terminal operator in entering data;

means for displaying messages decoded from said computer data word and indicative of terminal operation;

means for manually causing entry of data into said medical record after visual verification thereof on said data display means;

means operative in response to an identification code for enabling terminal operation;

a plurality of indicator lamps, each associated with a respective test button and control button and each operative in response to a respective data word from said computer to indicate the receipt of corresponding data from said computer; and wherein said logic circuitry includes:

a shift register having a serial input and serial output adapted for connection to a data transmission link;

an address decoder coupled to predetermined bit positions of said shift register and operative to provide an output indication upon receipt of a predetermined station address;

a read and write decoder coupled to predetermined bit positions of said shift register and operative to provide read and write command signalS to said logic circuitry upon receipt of data words from said computer;

a plurality of data buffers, each coupled to predetermined bit positions of said shift register and each operative in response to data in said predetermined bit positions to provide an output signal; and a plurality of lamp drivers, each coupled to a respective data buffer, and each operative in response to a respective output signal therefrom to cause respective energization of said message displays, visual indicators and test and control button indicators.

2. A data terminal for the entry of medical test data into a computer-based medical record of a patient comprising:

a plurality of test buttons each representing a respective medical test, the results of which are to be entered into said medical record;

a plurality of control buttons for initiating respective control steps in said terminal;

a data keyboard for the manual entry of numerical data;

logic circuitry coupled to said test buttons, control buttons and data keyboard and operative upon actuation of said test buttons, control buttons and keyboard to provide digital signal representations of said actuated test buttons, control buttons and keyboard;

means for assembling said digital signal representations into data words for transmission to a computer;

means for decoding data words received from said computer;

means for visually displaying numerical data decoded from said computer data word;

means for visually indicating subsequent steps to be taken by a terminal operator in entering data;

means for displaying messages decoded from said computer data word and indicative of terminal operation;

means for manually causing entry of data into said medical record after visual verification thereof on said data display means;

means operative in response to an identification code for enabling terminal operation;

a plurality of visual indicators, each associated with a respective test button and control button and each operative in response to a respective data word from said computer to indicate the receipt of corresponding data from said computer; and wherein said logic circuitry includes:

a shift register having a serial input and serial output adapted for connection to a data transmission link;

an address decoder coupled to predetermined bit positions of said shift register and operative to provide an output indication upon receipt of a predetermined station address;

a read and write decoder coupled to predetermined bit positions of said shift register and operative to provide read and write command signals to said logic circuitry upon receipt of data words from said computer;

a plurality of data buffers, each coupled to predetermined bit positions of said shift register and each operative in response to data in said predetermined bit positions to provide an output signal; and a plurality of drivers, each coupled to a respective data buffer, and each operative in response to a respective output signal therefrom to cause respective energization of said message displays, visual indicators and test and control button indicators.

3. A data terminal for the entry of medical test data into a computer-based medical record of a patient comprising:

means operative in response to an identification code for enabling terminal operation;

means for transmitting a patient identification code to a computer for selection of the medical record stored in memory for an associated patient;

a plurality of test buttons each representing a respective medical test, the results of which are to be entered into said medical record;

a plurality of control buttons for initiating respective control steps in said terminal;

a data keyboard for the manual entry of numerical data;

a plurality of visual indicators each associated with a respective test button and respective control button;

a multi-digit display for visually displaying numerical data;

a plurality of visual indicators for denoting subsequent steps to be performed by a terminal operator in entering data;

a display for messages indicative of terminal operation;

logic circuitry coupled to said test buttons, control buttons and data keyboard and operative to provide digital signal representations of actuated ones of said test buttons, control buttons and keyboard;

circuit means for assembling said digital signal representations into data words for transmission to a computer, said circuit means including storage means for storing data, means for entering data representing an actuated test button, control button or data keyboard into said storage means, and means for transmitting data in said storage means to said computer;

means for decoding data words received from said computer, each of said data words from said computer having an address portion for identifying said terminal and a data portion for controlling operation of said terminal indicators, said decoding means including:

means for visually displaying data on said multi-digit display;

means for energizing selected ones of said subsequent step indicators in accordance with data entering steps to be performed;

means for displaying messages on said message display indicative of terminal operation; and means for manually causing entry of data into said medical record after visual verification thereof on said multi-digit display.

4. A data terminal according to claim 3 wherein said numerical data display means includes:

a first multi-digit display for representing a patient identification number; and a second multi-digit display for representing test results received by said computer.

5. A data terminal according to claim 3 including means having a first manually actuable control button operative to cause said computer to retain a patient identification number throughout a predetermined testing sequence; and means including a second manually actuable control button operative to cause said computer to retain a test number throughout a predetermined testing sequence.

6. A data terminal according to claim 3 wherein said step denoting visual indicators include:

a patient identification indicator for visually indicating after said terminal is enabled that a patient identification number is to be entered;

a patient identification check indicator for visually indicating after entry of a valid patient identification number that a check digit is to be entered by said keyboard;

a test identification indicator for visually indicating after entry of a valid check digit that a test identification is to be entered by said test buttons; and a data indicator for visually indicating after entry of a test identification that test data is to be entered by said keyboard.

7. A data terminal according to claim 3 wherein said first named means includes a card reader adapted to receive a coded identification card and to decode the identification number contained therein;

and wherein said circuit means is operative to transmit said identification number to said computer, the receipt of a valid or an invalid identification number causing respective data words to be transmitted to said terminal to produce display of appropriate messages on said message display.

8. A data terminal according to claim 3 wherein said decoding means includes:

storage means having an input and output adapted for connection to a data transmission link coupled to said computer;

an address decoder coupled to said storage means and operative to provide an output indication upon receipt from said computer of a predetermined terminal address;

a read and write decoder coupled to said storage means and operative to provide read and write command signals to said terminal circuitry upon receipt of data words from said computer;

a plurality of data buffers each coupled to said storage means and each operative in response to predetermined data to provide an output signal; and a plurality of drivers each coupled to a respective data buffer and each operative in response to a respective output signal therefrom to cause respective energization of said message display, numerical display, subsequent step indicators and test and control button indicators.

9. A data terminal according to claim 3 wherein said multidigit display is operative in conjunction with said decoding means to indicate a patient identification code received by said computer.

* * * * *